United States Patent [19]
Rollins

[11] 3,763,391
[45] Oct. 2, 1973

[54] COLOR TELEVISION CONVERGENCE APPARATUS

[75] Inventor: George Ernest Rollins, Batavia, N.Y.

[73] Assignee: GTE Sylvania Incorporated, Seneca Falls, N.Y.

[22] Filed: Dec. 29, 1971

[21] Appl. No.: 213,698

[52] U.S. Cl. .......... 315/13 C
[51] Int. Cl. .......... H01j 29/50
[58] Field of Search .......... 315/13 C, 27 TD, 315/27 GD

[56] References Cited

UNITED STATES PATENTS 3,382,400 5/1968 Hart .......... 315/13 C
3,586,902 6/1971 Siegel .......... 315/13 C
3,613,108 10/1971 Spanhanke .......... 315/13 C

*Primary Examiner*—Carl D. Quarforth
*Assistant Examiner*—J. M. Potenza
*Attorney*—Norman J. O'Malley et al.

[57] ABSTRACT

Convergence apparatus for converging one electron beam in a cathode ray tube in a color television receiver to the converged position of the other two beams is shown. The convergence apparatus includes transistors for differentially energizing the convergence winding and differential amplitude control of the convergence signals.

9 Claims, 6 Drawing Figures

COLOR TELEVISION CONVERGENCE APPARATUS

CROSS-REFERENCE TO RELATED APPLICATIONS

Dong W. Rhee, "Convergence Apparatus Utilizing Independently Adjustable Half-Period Triangular Waveforms," Ser. No. 135,991, filed Apr. 21, 1971, now U.S. Pat. No. 3,708,715, and assigned to the same assignee as the present invention; and William Elias et al., "Signal Generating Circuit for a Deflection System", Ser. No. 175,159 filed Aug. 26, 1971, and assigned to the same assignee as the present invention.

BACKGROUND OF THE INVENTION

This invention relates to convergence apparatus for converging the electron beams in a cathode ray tube in a color television receiver. In typical color television receivers the cathode ray tube has a screen with three color phosphors thereon in a regular pattern. The phosphors are energized by respective electron beams each of which strike one set of phosphors. The electron beams are synchronously deflected by deflection apparatus in horizontal and vertical directions. The electron beams, however, generally do not converge due to manufacturing and design tolerances. Accordingly, convergence apparatus including a yoke having convergence windings for each beam positioned about the neck of the cathode ray tube is incorporated into the television receiver. Signals derived from the deflection signals are variably coupled to the windings of the convergence yoke for correcting the deflection of the electron beams so that they all energize the proper phosphors on the proper areas of the screen at the proper times. Also, the usual practice is to converge the beams that energize the red and green phosphors and then correct the deflection of the beam that energizes the blue phosphors to superimpose the blue beam on the red and green beams.

Convergence of the electron beams requires a variable amount of correction because the misconvergence of the beams ordinarily varies over different areas of the screen. Furthermore, the direction of correction may be different both from one receiver to another and for different areas of the screen of a particular receiver. Typical prior art convergence apparatus uses either passive or active components with variable components for varying the amplitude of the convergence signals.

In many such prior art convergence circuits the controls interact, that is, varying one control affects signals other than the desired signal thereby making convergence a complex, laborious, and time consuming process. While other circuits have more or less independent controls with less control interaction, they suffer from other disadvantages. For example, a particular problem has been the convergence of the third (usually blue) beam after the other two beams are converged. Some prior art circuits provide only amplitude control which while independent for the two halves of the raster, is capable of moving the third beam in one direction only from its unconverged position. For example, during vertical convergence the third beam can be moved upward only from its unconverged position in such circuits. Other prior art circuits include a reversing switch so that the direction of movement of the third beam can be reversed. However, in such circuits the direction of movement of the third beam still is the same on both halves of the raster. In still other prior art circuits the beam can be moved in either direction on one half of the raster but in one direction only on the other half of the raster. Thus, known prior art convergence apparatus suffers from one or more disadvantages such as control interaction, lack of independence between controls, or similar disadvantages.

OBJECTS AND SUMMARY OF THE INVENTION

Accordingly, it is a primary object of this invention to provide new and unobvious convergence apparatus that obviates the above-noted disadvantages of the prior art.

It is a further object of this invention to provide convergence apparatus for converging one electron beam in a color cathode ray tube to the converged position of the other two beams in which the control of the beam during scanning of different halves of the raster is independent.

It is a still further object of this invention to provide new and novel circuitry for use in convergence apparatus.

In one aspect of this invention the above objects and other objects and advantages are achieved in convergence apparatus for use in a color television receiver for converging an electron beam at a screen in a cathode ray tube to the converged positions of two other electron beams. The convergence apparatus includes first and second transistors and a convergence winding connected between output electrodes of the transistors. Signal generating means provides first and second convergence signals during deflection of the electron beams across respective halves of the screen. First and second differentially variable means differentially couple both of the first and second convergence signals to input electrodes of the transistors.

DETAILED DESCRIPTION OF THE PREFERRED EMBODIMENT

For a better understanding of the present invention, together with other and further objects, advantages, and capabilities thereof, reference is made to the following disclosure and appended claims in connection with the above-described drawings.

Figure 1:
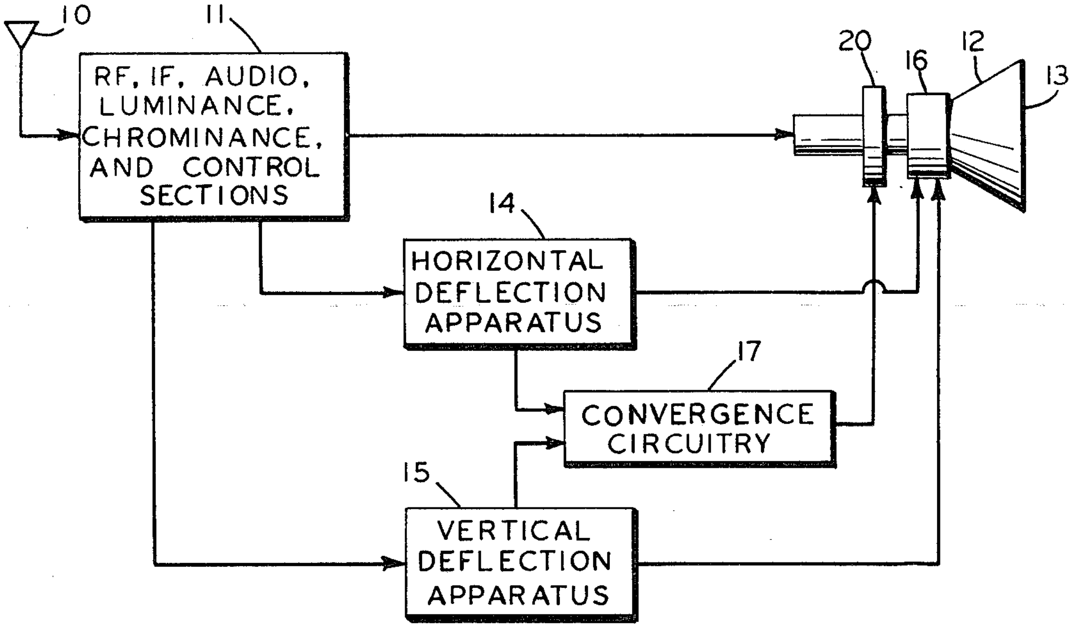
FIG. 1 is a block diagram of a color television receiver in which the invention can be utilized.

In FIG. 1 a block diagram of a color television receiver is illustrated. An antenna 10 is connected to a signal receiver 11 that includes the usual RF, IF, audio, luminance, chrominance, and control circuitry. Outputs of signal receiver 11 couple video signals to a cathode ray tube (CRT) 12 having a screen 13 having red, green, and blue (tri-color) phosphors thereon. CRT 12 has a plurality of electron guns therein, for example, three electron guns, for generating a plurality of electron beams each of which energize a respective one of the three phosphors.

Outputs of signal receiver 11 are also coupled to horizontal deflection apparatus 14 and to vertical deflection apparatus 15 each of which have outputs connected to corresponding windings of a deflection yoke 16 positioned about the neck of CRT 12 for deflecting the electron beams in CRT 12 to scan screen 13 in vertical and horizontal directions creating a generally rectangular raster. An output from horizontal deflection apparatus 14 is connected to an input of convergence apparatus including convergence circuitry 17 which has an output connected to a convergence yoke 20 positioned about the neck of CRT 12. An output of vertical deflection apparatus 15 is connected to a second input of convergence circuitry 17. Horizontal and vertical deflection apparatus 14 and 15 provide appropriate convergence signals at the respective deflection or scanning rates to convergence circuitry 17. Convergence circuitry 17 in turn provides suitable convergence signals to the convergence windings of yoke 20. Each of the convergence windings is associated with a respective one of the electron beams for correcting the deflection thereof to converge the beams. In a typical convergence assembly the deflection of each beam is corrected by a vertical convergence winding and a horizontal convergence winding each of which may be a split winding.

The invention will be described with reference to vertically converging one of the electron beams, for example, the electron beam that energizes the blue phosphors, to the converged position of two other electron beams in a typical color television receiver. Those skilled in the art will realize, however, that the invention has broader application than the specific embodiment disclosed.

Figure 2:
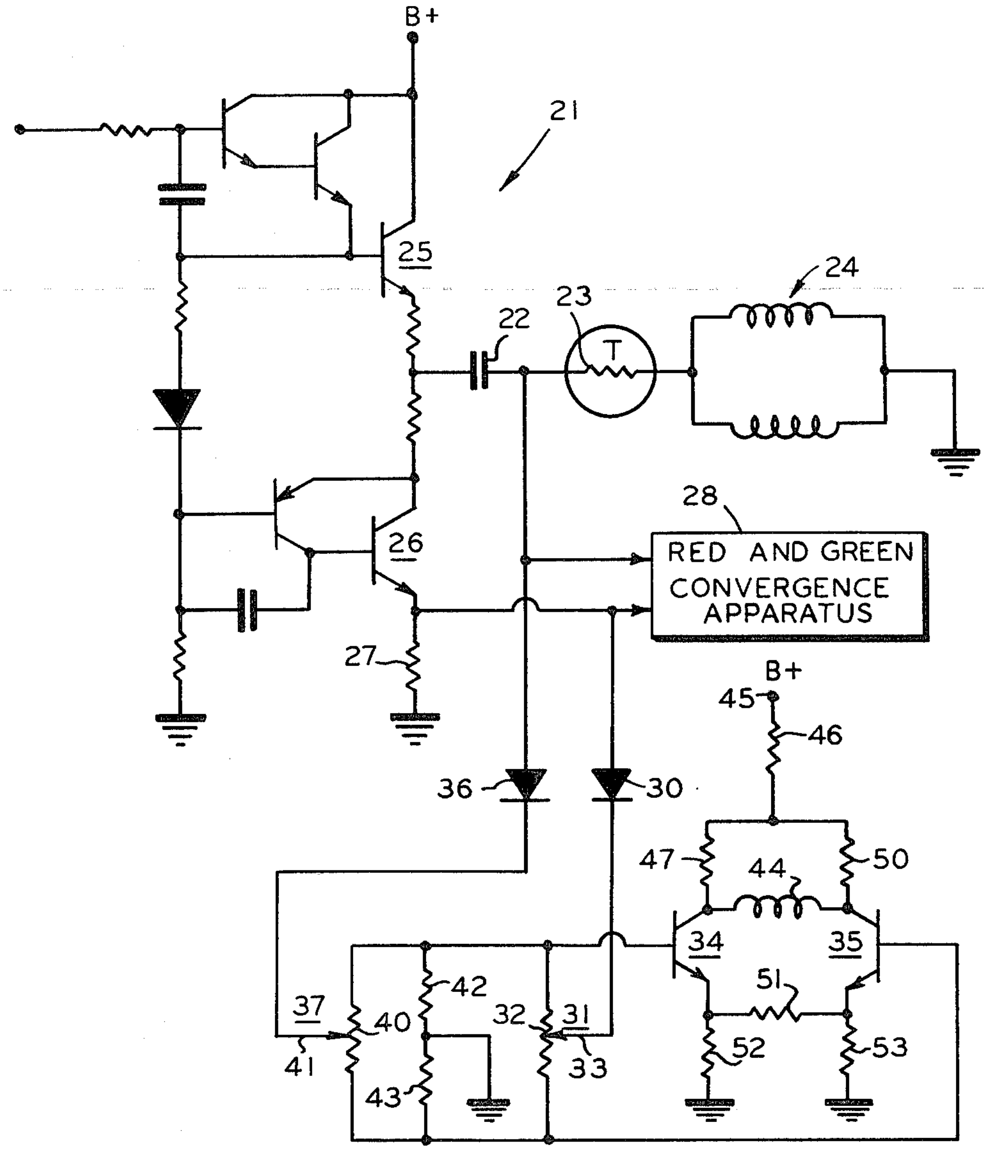
FIG. 2 is a schematic diagram of the preferred embodiment of the invention.

FIG. 2 illustrates a schematic diagram of the preferred embodiment of the invention. An output of a vertical drive or output circuit 21 is connected by a coupling capacitor 22 in series with a thermistor 23 to the vertical deflection windings 24 of yoke 16. Components 21–24 comprise a signal generating means for providing a first convergence signal during deflection of the electron beams across the first or upper half of screen 13 and a second convergence signal during deflection of the electron beams across the second or lower half of screen 13. Components 21–24 are part of vertical deflection apparatus 15 and yoke 16. A more complete description of the illustrated circuitry can be found in the above-referenced copending application Ser. No. 175,159.

Vertical output circuit 21 has a pair of drive transistors 25 and 26 which apply a proper signal to vertical deflection windings 24 to deflect the electron beams in CRT 12 vertically across screen 13. An emitter of transistor 26 is connected by a resistor 27 to a common conductor illustrated as circuit ground. The emitter of transistor 26 is connected by a diode 30 to a differentially variable means illustrated as a variable resistive means or potentiometer 31. Potentiometer 31 has a resistive element 32 and a tap 33 connected to diode 30. Resistive element 32 is connected between input electrodes or bases of transistors 34 and 35. The emitter of transistor 26 is also connected to red and green convergence apparatus 28 which includes the red and green convergence windings of yoke 20.

The junction between capacitor 22 and thermistor 23 is connected by a diode 36 to a differentially variable means illustrated as a variable resistive means or potentiometer 37. Potentiometer 37 has a resistive element 40 connected between the bases of transistors 34 and 35 in parallel with resistive element 32 and a tap 41 connected to diode 36. The base of transistor 34 is connected by a resistor 42 to ground, and the base of transistor 35 is connected by a resistor 43 to ground. The junction between capacitor 22 and thermistor 23 is also connected to red and green convergence apparatus 28.

Transistors 34 and 35 each have output electrodes or collectors connected to respective ends of a convergence winding 44 for differentially energizing winding 44. Winding 44 is contained in convergence yoke 20. A source of positive potential illustrated as a terminal 45 is connected by a resistor 46 in series with a resistor 47 to the collector of transistor 34, while the collector of transistor 35 is connected by a resistor 50 to the junction of resistors 46 and 47. A resistor 51 is connected between common electrodes or emitters of transistors 34 and 35. The emitter of transistor 34 is connected to ground by a resistor 52, while the emitter of transistor 35 is connected to ground by a resistor 53.

Figure 3:
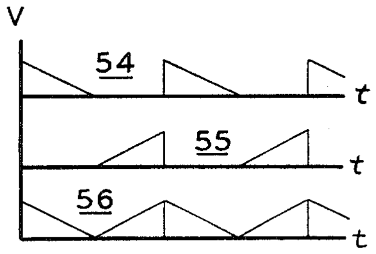
FIG. 3 is a waveform diagram to aid in explaining the invention.

In operation convergence signals are coupled from the vertical output circuit via diodes 30 and 36 to taps 33 and 41 of potentiometers 31 and 37. The waveforms of the signals coupled to taps 33 and 41 are illustrated by waveforms 54 and 55, respectively, of FIG. 3. Waveform 54 has a generally sawtooth waveform during deflection of the electron beams in CRT 12 across the upper half of screen 13. Waveform 55 has a generally sawtooth waveform during deflection of the electron beam in CRT 12 across the lower half of screen 13. Resistive element 32 of potentiometer 31 couples signals 54 to the bases of transistors 34 and 35, while resistive element 40 of potentiometer 37 couples signal 55 to the bases of transistors 34 and 35. Thus, the signals at the bases of transistors 34 and 35 each have a waveform corresponding to waveform 56 of FIG. 3. These signals at the bases of transistors 34 and 35 are differentially variable by variable taps 33 and 41 so that the ratio of the signals at the bases of transistors 34 and 35 can be varied.

The red and green convergence circuitry is not illustrated in detail in FIG. 2, however, it can be of a suitable type known in the prior art and signals similar to waveforms 54–56 can be used to converge the red and green beams.

Figure 4A:
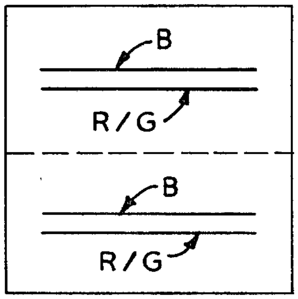
FIGS. 4A, 4B, and 4C are schematic illustrations of electron beams on a cathode ray tube raster to aid in explaining the invention.

Next assume that the red and green beams are converged by convergence apparatus 28 to the positions illustrated by lines R/G of FIG. 4A. In both the first or upper and second or lower halves of the raster the unconverged or free-fall position of the blue beam is above the converged red and green beams. Assuming tap 33 is centered on resistive element 32 of potentiometer 31, approximately equal signals are coupled to the bases of transistors 34 and 35 during scanning of the top half of the raster. Thus, approximately equal currents flow through transistors 34 and 35 and no signal is coupled to winding 44. To move the blue beam downward to the converged position of the red and green beams, tap 33 of potentiometer 31 is varied so that a larger signal is coupled to the base of transistor 35 and a smaller signal is coupled to the base of transistor 34. Thus, transistor 35 conducts more current while transistor 34 conducts less current and a differential output signal is applied across winding 44 to move the blue beam downward. During scanning of the bottom half of the raster, tap 41 of potentiometer 37 is similarly varied to move the blue beam downward to converge it to the converged position of the red and green beams.

Figure 4B:
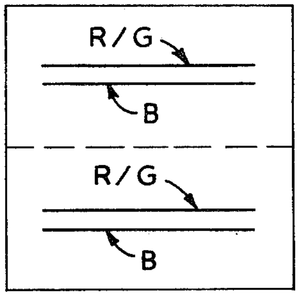

In FIG. 4B the unconverged blue beam lands below the unconverged red and green beams on both the top and bottom halves of the raster. If this situation occurs, the blue beam can be independently moved upward during scanning of each half of the raster by varying potentiometers 31 and 37 so that larger signals are coupled to the base of transistor 34 than to the base of transistor 35. Thus, during scanning of both halves of the raster, transistor 34 conducts more current than transistor 35 thereby differentially coupling an output signal across winding 44 in a direction opposite to that for correcting the misconvergence illustrated in FIG. 4A.

Figure 4C:
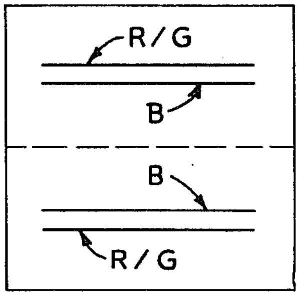

In FIG. 4C the blue beam is illustrated below the converged red and green beams during scanning of the top half of the raster and above the red and green beams during scanning of the bottom half of the raster. To correct this misconvergence, potentiometer 31 is varied to couple a larger signal to the base of transistor 34, while potentiometer 37 is varied to couple a larger signal to the base of transistor 35. Thus, the blue beam is moved upward during scanning of the top half of the raster and downward during scanning of the bottom half of the raster. Similarly, the direction of movment of the blue beam can be downward during scanning of the top half of the raster and upward during scanning of the bottom half of the raster.

Diodes 30 and 36 rectify the signals coupled therethrough to provide the proper convergence signals to potentiometers 31 and 37. They also prevent reverse current flow to the deflection apparatus. Transistors 34 and 35 are biased as a class B differential amplifier. Resistor 51 is sufficiently large so that very little current flows through it. Resistor 51 decreases the drift of transistors 34 and 35 that would occur otherwise and also increases the differential gain of the transistors.

Accordingly, there has been described a novel convergence apparatus that exhibits many advantages over the prior art. The control of the convergence of the third beam which is to be converged to the converged position of the first two beams is independent over the two halves of the raster. The third beam can be moved in either direction from a free-fall position during scanning of one half of raster independent of the control of the beam during scanning of the other half of the raster. Also, the convergence signals are differentially coupled to the convergence winding by a novel circuit.

While there has been shown and described what is at present considered the preferred embodiment of the invention, it will be obvious to those skilled in the art that various changes and modifications may be made therein without departing from the scope of the invention as defined by the appended claims.

I claim as my invention:

1. In a color television receiver having horizontal and vertical deflection apparatus for deflecting a plurality of electron beams in a color cathode ray tube having a screen with red, green, and blue phosphors thereon with said electron beams energizing respective ones of said phosphors, convergence apparatus for converging one of said electron beams to the converged positions of two other ones of said electron beams comprising:

first and second transistors each having input, output, and common electrodes;

a convergence winding connected between the output electrodes of said first and second transistors for correcting the deflection of said one of said electron beams;

signal generating means included in said vertical deflection apparatus for providing a first convergence signal during deflection of said electron beams across a first half of said screen and a second convergence signal during deflection of said electron beams across a second half of said screen;

a first differentially variable means connected to the input electrodes of said first and second transistors and to said signal generating means for differentially coupling said first convergence signal to the input electrodes of said first and second transistors and operable to move said one of said electron beams vertically during scanning of the upper half of said screen; and a second differentially variable means connected to the input electrodes of said first and second transistors and to said signal generating means for differentially coupling said second convergence signal to the input electrodes of said first and second transistors and operable to move said one of said electron beams vertically during scanning of the lower half of said screen.

2. Convergence apparatus as defined in claim 1 wherein said one of said electron beams is the electron beam for energizing said blue phosphors.

3. Convergence apparatus as defined in claim 1 including a resistor connected between the common electrodes of said first and second transistors.

4. Convergence apparatus as defined in claim 1 wherein said first and second differentially variable means each includes a variable resistive means with a resistive element connected between the input electrodes of said first and second transistors and a variable tap connected to said signal generating means.

5. In a color television receiver having a cathode ray tube having first, second, and third electron guns for generating first, second, and third electron beams, respectively, for energizing red, green, and blue phosphors, respectively, on a screen, vertical and horizontal deflection apparatus for deflecting said electron beams, and convergence apparatus having first, second, and third windings associated with respective ones of said electron beams, said convergence apparatus comprising:

means connected to said first and second windings for converging said first and second electron beams;

first and second transistors each having input, output, and common electrodes, said output electrodes being connected to respective ends of said third winding for differentially energizing said third winding for converging said third electron beam to the converged position of said first and second electron beams;

signal generating means for providing a first convergence signal during deflection of said electron beams across a first half of said screen and a second convergence signal during deflection of said electron beams across a second half of said screen;

first differentially variable means connected to said signal generating means and to the input electrodes of said first and second transistors for differentially varying the amplitude of said first convergence signal coupled to the input electrodes of said first and second transistors; and second differentially variable means connected to said signal generating means and to the input electrodes of said first and second transistors for differentially varying the amplitude of said second convergence signal coupled to the input electrodes of said first and second transistors.

6. Convergence apparatus as defined in claim 5 including a resistor connected between the common electrodes of said first and second transistors.

7. Convergence apparatus as defined in claim 5 wherein said first and second differentially variable means each include a variable resistive means having a resistance element connected between the input electrodes of said first and second transistors and a variable tap connected to said signal generating means.

8. Convergence apparatus as defined in claim 5 wherein said signal generating means is included in said vertical deflection apparatus, said first convergence signal has a sawtooth waveform during vertical scanning of the upper half of said screen and a repetition rate equal to the vertical scanning rate, and said second convergence signal has a sawtooth waveform during vertical scanning of the lower half of said screen and a repetition rate equal to the vertical scanning rate.

9. Convergence apparatus as defined in claim 8 including a resistor connected between the common electrodes of said first and second transistors.

* * * * *